(12) United States Patent
Colbum et al.

(10) Patent No.: US 7,551,524 B2
(45) Date of Patent: Jun. 23, 2009

(54) METHODS AND APPARATUS TO COMPENSATE FOR POWER OUTPUT VARIATIONS OVER TIME

(75) Inventors: Kevin L. Colbum, Greeley, CO (US); D. Mitchel Hanks, Fort Collins, CO (US); Lawrence N. Taugher, Loveland, CO (US); Greg J. Lipinski, Loveland, CO (US); Andrew L Van Brocklin, Corvallis, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 941 days.

(21) Appl. No.: 11/051,307

(22) Filed: Feb. 4, 2005

(65) Prior Publication Data

US 2006/0176800 A1    Aug. 10, 2006

(51) Int. Cl.
  *G11B 11/00* (2006.01)
(52) U.S. Cl. .................................. 369/13.27; 369/47.53
(58) Field of Classification Search ........................ None
  See application file for complete search history.

(56) References Cited

U.S. PATENT DOCUMENTS

| | | | |
|---|---|---|---|
| 6,418,102 B1 | 7/2002 | Suga | |
| 7,187,637 B2 * | 3/2007 | Pate et al. | 369/53.21 |
| 7,304,936 B2 | 12/2007 | Yang et al. | |
| 7,420,580 B2 * | 9/2008 | Hanks et al. | 347/224 |
| 2003/0108708 A1 | 6/2003 | Anderson et al. | |
| 2004/0001411 A1 | 1/2004 | Morishima | |
| 2004/0062179 A1 | 4/2004 | Tsurumi et al. | |
| 2006/0092793 A1 * | 5/2006 | Hanks et al. | 369/47.53 |
| 2006/0133239 A1 * | 6/2006 | Colburn et al. | 369/47.5 |

FOREIGN PATENT DOCUMENTS

WO    2006083981 A1    8/2006

OTHER PUBLICATIONS

International Search Report dated May 17, 2006, 3 pages.
Malaysia Search Report; Apr. 12, 2008; 1 page; Malaysia.

* cited by examiner

*Primary Examiner*—Joseph H Feild
*Assistant Examiner*—Parul Gupta (57) ABSTRACT

A method of compensating for output variations in laser power output over time in a system using a laser to record visible marks on an optical disc, the method comprising (a) applying a test light beam from the laser to the optical disc to determine a test value of an optical parameter, (b) determining a difference between the test value and a predetermined reference value for the optical parameter, and (c) adjusting the laser power output to compensate for the difference.

55 Claims, 7 Drawing Sheets

METHODS AND APPARATUS TO COMPENSATE FOR POWER OUTPUT VARIATIONS OVER TIME

BACKGROUND

Recently, apparatus and methods have been developed with the ability to generate an image on media using a low power laser. Such lasers are employed to read and write data on the data side of optical storage discs, such as CDs, DVDs and the like. Typically, various types of data are written on a data side of a disc by a laser beam while the disc is rotating. Data may be recorded by making marks on the recording media, indicative of a zero or one. Various data writing strategies have been employed, for the purposes of creating desirably shaped marks precisely positioned and having sharp edges to enable detection.

The side of a data disc opposite the data side is often used for handwriting or affixing or marking a label with descriptions and illustrations corresponding to the recorded data. Recently, apparatus and methods have been developed with the ability to generate a label on the non-data side of an optical disc using the same laser that was employed to read and write digital or electronic data on the data side of the disc. See U.S. Patent Application Publication No. 2003/0108708 (Anderson, et al.), disclosing the use of laser sensitive materials on a disc label that react chemically with the application of light and heat and result in changes in color and shading on the label.

In making marks on either side of a disc using an optical disc drive, the laser power output may be reduced with time, through dust accumulation or contamination build-up on optics associated with the laser. Effective laser power output may also be diminished over time due to attrition of laser output or front end sensors because of aging. Consequently, initial laser power output that was calibrated and set in the factory with the front sense diode voltage may be reduced significantly during usage. Some attrition of laser power output is not sensed by the front sense diode, since it measures power leaving the laser prior to the laser beam being processed by the optics. In addition, the outputs from photodetectors used for sensing the reflections of laser power output may be skewed or distorted due to temperature variations.

In marking on the label side of the disc, using the technology described in the Anderson application, the chemistry on the label is optimized to absorb as much light as possible at the wavelength of the writing laser beam. As a result, there is very little reflectivity of light at the frequency of the writing laser, and the change in reflectivity between written and unwritten areas may be less than the noise level of the detection circuit. Accordingly, it is difficult to calibrate optical power on the label recording medium, because of the low contrast between unwritten and written medium.

One current method for calibrating laser power output is to measure the power required to correctly mark a medium using a marking procedure for the medium. Then the power measurement method is replicated in the drive factory, and each drive is tuned to the power specified by the medium for good marking. This method relies on having effective correlation between these two power measurements, which is sometimes not the case. Moreover, this approach does not involve measuring marks made in the field to determine whether effective optical density is being achieved.

SUMMARY OF THE INVENTION

A method of compensating for variations in laser power output over time in a system using a laser to record visible marks on an optical disc, the method comprising (a) applying a test light beam from the laser to the optical disc to determine a test value of an optical parameter, (b) determining a difference between the test value and a predetermined reference value for the optical parameter, and (c) adjusting the laser power output to compensate for the difference.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In one embodiment of the present invention, a laser is used for providing images on a label side of an optical disc opposite to a data side of the disc. The laser is initially calibrated during production to provide an image of suitable optical density. During use, the laser beam output is sensed by a front sense diode and feedback is provided to adjust the laser power output in order to provide suitable images. However, the optics elements downstream from the laser may become dirty from dust or material ablation, thereby reducing the amount of light that reaches a recording medium. This embodiment of the present invention provides for methods and apparatus to measure the amount of light reaching the recording medium and to adjust the laser as needed to maintain suitable optical density for the label images.

The laser may be calibrated by directing the laser beam to a mirror band on the optical disc. The reflected light is sensed and compared to a known reflectivity value for the band. Data is generated representative of the difference between the reflected light and the known reflectivity value. The laser power output is then increased as needed in response to the difference data in order to maintain a required level of laser light reaching the optical disc.

Laser System

Figure 1:
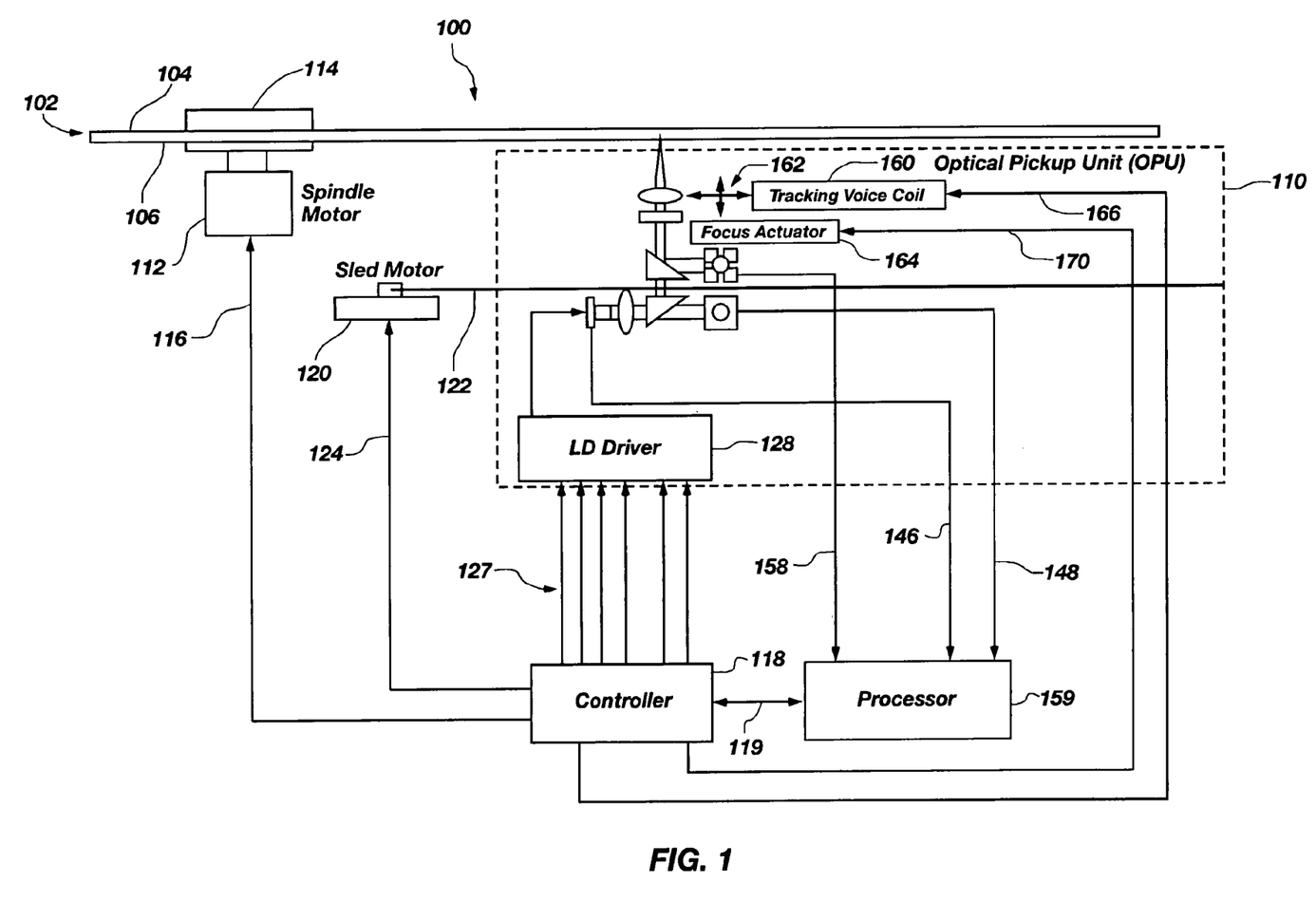
FIG. 1 is a schematic diagram of a laser writing and detection system according to an embodiment of the present invention.
Figure 2:
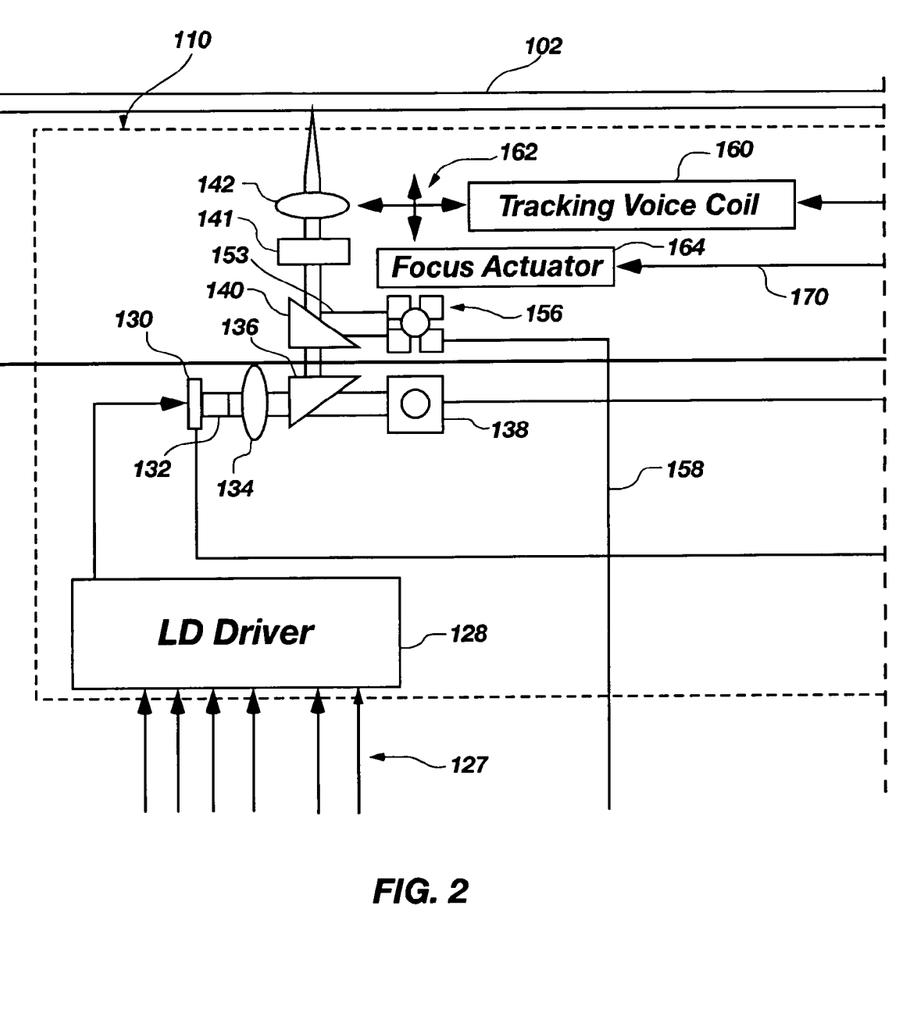
FIG. 2 is a partial schematic view of the diagram shown in FIG. 1.

FIGS. 1 and 2 show a data storage device 100 according to an embodiment of the invention, in which a laser 130 is used for reading from and/or writing to an optical disc 102. More specifically, the data storage device 100 is used for reading and/or writing to an optically writable data side 104 of the optical disc 102. After the data writing operation is completed, the optical disc is turned over so that the label side 106 of optical disc may be written upon, for the purpose of labeling and otherwise marking the optical disc 102. An optical pickup unit (OPU) 110 provides the energy beam, lenses and other devices necessary to provide energy beams for reading and writing the medium, as explained below.

The storage device 100 includes a spindle motor 112 and a spindle 114 for rotating the optical disc 102. Specifically, the optical disc 102 is situated on the spindle 114, which is rotated or moved by the spindle motor 112 to a position specified by an input control signal 116. A controller 118 provides control signal 116 to the spindle motor 112, and may be comprised of control hardware and/or software.

The storage device 100 further includes a sled motor 120 and a sled rail 122 for moving a sled (not shown) that supports the OPU 110. Specifically, the OPU 110 is situated on the sled that is moved on the sled rail 122 by the sled motor 120 to a given position specified by a sled control signal 124 coming from controller 118.

The OPU 110 writes and reads label data on label side 106 of optical disc 102. In one embodiment, the optical disc 102 is rotated by spindle 114 as the label data is written on optical disc 102. The sled causes the OPU 110 to move radially so that the label data is written in radial increments that may or may not constitute tracks on optical disc 102. The manner of moving the spindle 114 and sled to cause the OPU 110 to write label data may vary in different embodiments of the invention. Examples of this label writing operation are given in copending U.S. patent application Ser. No. 10/898,392, filed Jul. 23, 2004, entitled "Track Labeling On a Medium," and copending U.S. patent application Ser. No. 10/867,436, filed Jun. 14, 2004, entitled "Detecting Radius Of Optically Writable Label Side of Optical Disc At Which Markings Have Not Been Written."

Again referring to FIG. 1, controller 118 generates laser control signals 127 to a laser diode driver 128 to drive the OPU 110. A tracking voice coil 160 is connected to a fine adjustment mechanism 162 to make small adjustments to the tracking operation of the sled and sled motor 120. Concentric tracks, such as are used on the data side 104 of optical disc 102 may not be needed on the label side 106. Instead, the sled may move in small increments, such as about 150 micron steps, to provide the desired image labeling. A focus actuator 164 is associated with lens 142 to adjust focus of lens 142 as desired. A tracking control signal 166 is directed from controller 118 to the tracking voice coil 160. A focus control signal 170 is directed from the controller 118 to the focus actuator 164.

Next, looking at FIG. 2, the OPU 110 is shown in greater detail. Laser 130 is disposed to generate a light beam 132 that is directed to lens 134, changing the diverging beam to a substantially collimated beam. The light beam 132 then passes to a dichroic mirror 136 that causes a portion of the light beam to be reflected and pass through a polarizing beam splitter 140. The remainder of light beam 132 passes through dichroic mirror 136 to a front sense diode 138 that senses the strength of light beam 132. After passing through polarizing beam splitter 140, light beam 132 is directed through a quarter wave plate 141 and a focusing lens 142 to write on label surface 106 of optical disc 102.

The quarter wave plate 141 takes linearly polarized light from the laser (P polarized) and changes it into circularly polarized light. The circularly polarized light is reflected from the disc 102 and is changed back into linearly polarized light (S polarized) by the quarter wave plate 141. The resulting light is at 90 degrees polarization to the original light from the laser. This allows the returned S polarized light to be reflected by the polarizing beam splitter 140. The quarter wave plate 141 permits the beam splitter 140 to operate as is described below.

During generation of reference data for calibration, laser 130 again generates light beam 132 that passes through lens 134, acting to change the light beam 132 to a substantially collimated beam. Beam 132 passes through dichroic mirror 136 and polarizing beam splitter 140 to impinge upon an image written earlier on label surface 106 by beam 132. The resulting reflected beam from the label surface 106 of optical disc 102 passes back through lens 142 and quarter wave plate 141 to polarizing beam splitter 140. A portion of the reflected beam 153 is reflected to be intercepted by four photo-detectors 156. A SUM signal 158 is generated by the photo-detectors 156 and sent to a processor 159, shown in FIG. 1. This SUM signal corresponds to the reflected light from the optical disc surface 106.

In a label writing operation, the laser 130 may emit a light beam having a wavelength of about 780 nanometers in order to effectively interact with chemicals on the medium and cause image marking to take place. The focus actuator 164 and tracking voice coil 160 are used in writing data on the data side 104 of optical disc 102. When writing to the label side 106, in some situations, tracking voice coil 160 may not be used, since there may not be any tracks to follow.

The laser diode driver 128 may utilize a digitally enabled current source set to a selected current value by an external resistor. The four photo-detectors 156 represent four quadrant sensors used to generate the SUM signal 158. The four photo-detectors 156 transmit this signal to the processor 159. In turn, the processor 159 may cause the controller 118 to generate control signals 127 to the laser diode driver 128, to thereby adjust the power level of laser 130.

Mirror Band Reflection

Figure 3:
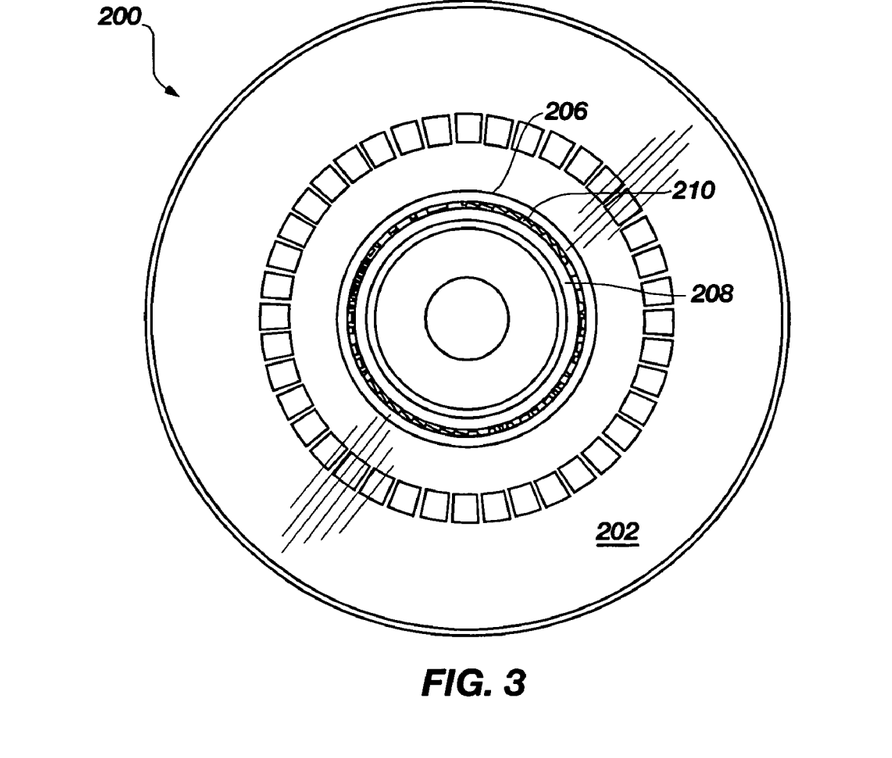
FIG. 3 is a planar view of an optical disc used in connection with an embodiment of the present invention.

FIG. 3 shows an optical disc 200 including a disc surface 202 having a mirror ring or band 206 of known reflectivity near the center of the disc. Mirror band 206 is adjacent to a ring spoke area 208 having spoke edges 210 that may be used for calibration. Alternately, a solid mirror band may be used.

The mirror band or area may be provided as part of the standard disk manufacturing process by leaving a band of substrate flat and un-embossed with pits or grooves. Also, a mirror band can be provided by masking a ring or other area of the normal metallic disc under-surface at the time that recording medium is coated on the disc. Alternately, a special metallic or other mirror surface may be applied to the recording medium to form a mirror band or area.

As discussed with respect to FIG. 2, the light beam 132 from the detection laser 130 is directed to the optical disc 102, corresponding to optical disc 200 in FIG. 3. During calibration, the light beam 132 strikes the mirror band 206 of the optical disc shown in FIG. 3 and is reflected back to the OPU 110. The reflected light beam 153 is directed to photo-detector 156 from the mirror area and generates the corresponding SUM signal 158.

Figure 4:
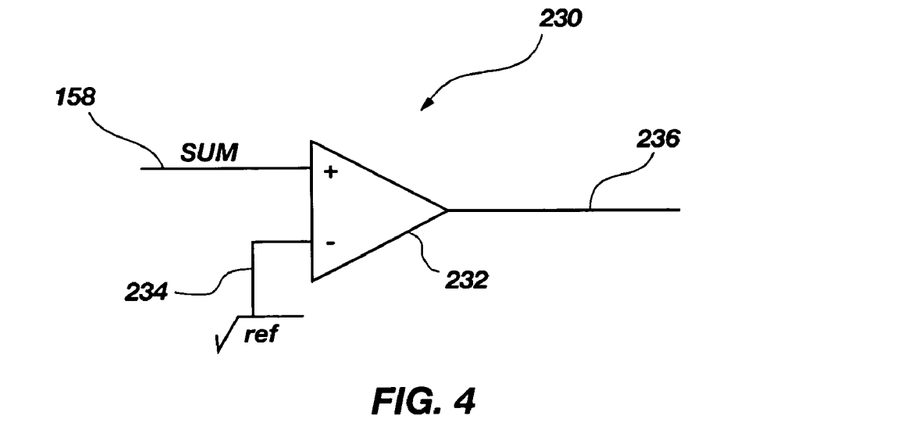
FIG. 4 is a schematic diagram of analog to digital converter circuitry used in connection with an embodiment of the present invention.

With reference now to FIG. 4, using processor 159, the SUM signal 158 may be passed through a threshold detector 230 comprising an analog to digital converter 232 having the SUM signal 158 as a positive input and a reference signal 234 as the negative input. The output signal 236 may be used to adjust the power level of laser 130 by comparing signal 236 to calibration data stored in the processor 159 in a manner discussed below.

Initial Preparation of Calibration Data for Laser Power Output

Figure 5:
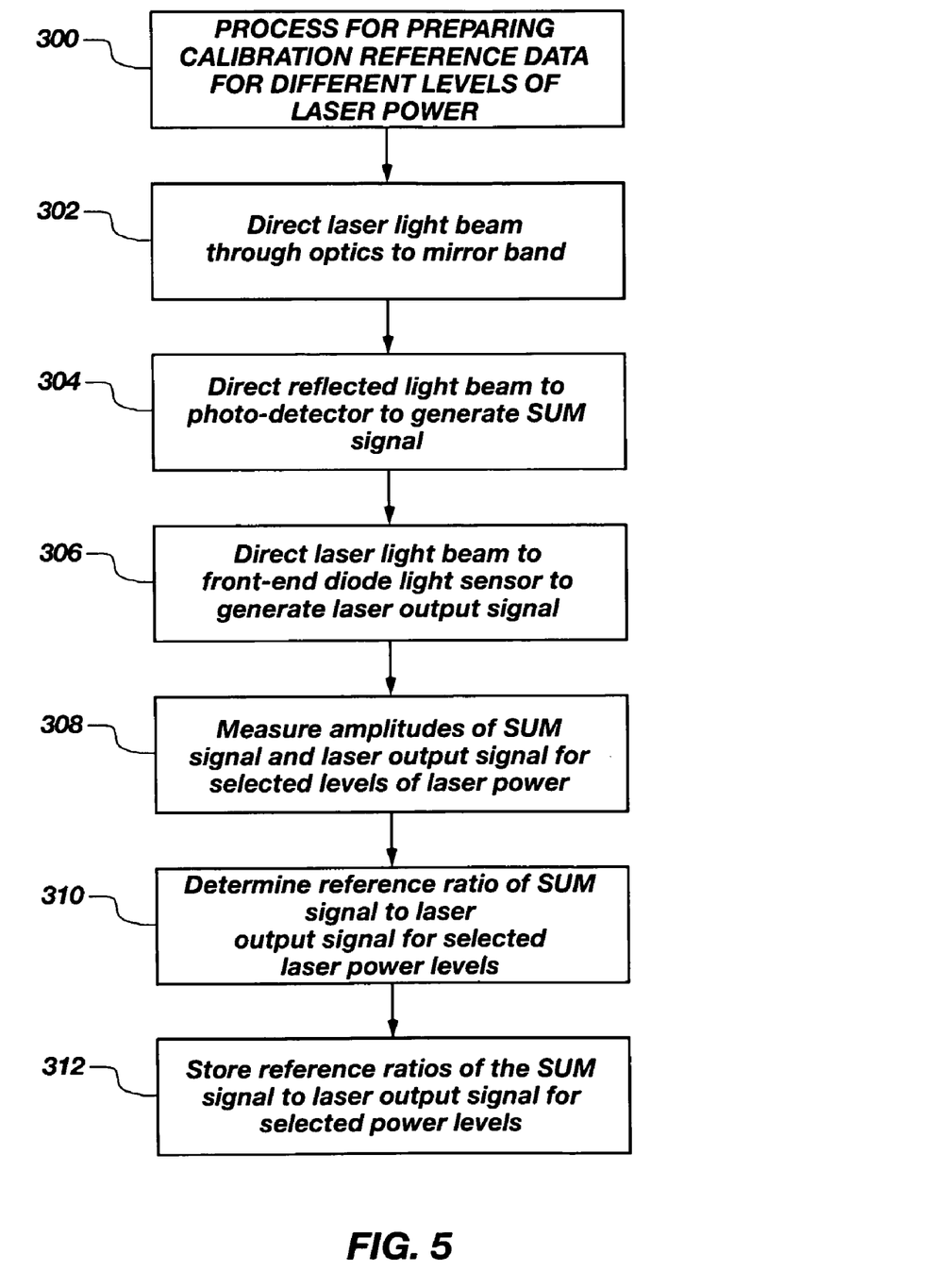
FIG. 5 is a flow diagram of a method for preparing reference data used in connection with an embodiment of the present invention.

Referring to FIG. 5, a process 300 is shown according to an embodiment of the present invention for preparing reference data for a laser 130 and storing the reference data at the time that the data storage device 100 is manufactured. At step 302, the laser 130 may be initially calibrated at the time of manufacture by directing a laser light beam 132 through the optics to the mirror band 206. At step 304, the reflected light beam 153 is directed to the four photo-detectors 156 resulting in the SUM signal 158 being produced. Next, at step 306, the light beam 132 from the output of the laser 130 may also be detected by the front sense diode 138 before the light beam 132 passes through certain elements of the optics. The front sense diode 138 generates a laser output signal 148 indicative of the level of power being emitted from laser 130 before the light beam 132 passes through all of the optics. Next, at step 308, the SUM signal 158 and the laser output signal 148 are measured in the factory for different selected power levels of the laser 130. At step 310, reference ratios of the SUM signal to the laser output signal for each selected power level are determined. At step 312, the reference ratios are stored in processor 159.

Adjustments to Laser Power Output Level During Use

During use of the laser 130, dust and ablation materials may accumulate on the optics elements, thereby reducing the amount of light that is passed through the optics elements to the optical disc label surface 106. Thus, over time the SUM signal 158 may decrease. In contrast, the light beam 132 that is detected by the front sense diode 138 will remain the same, except for small intensity decreases in laser output over a long period of time. Accordingly, the ratio of the SUM signal 158 over the laser output signal 148 will decrease over time. The power output of laser 130 will need to be increased to compensate for the partial loss of light as a laser beam passes through the optics elements.

Figure 6:
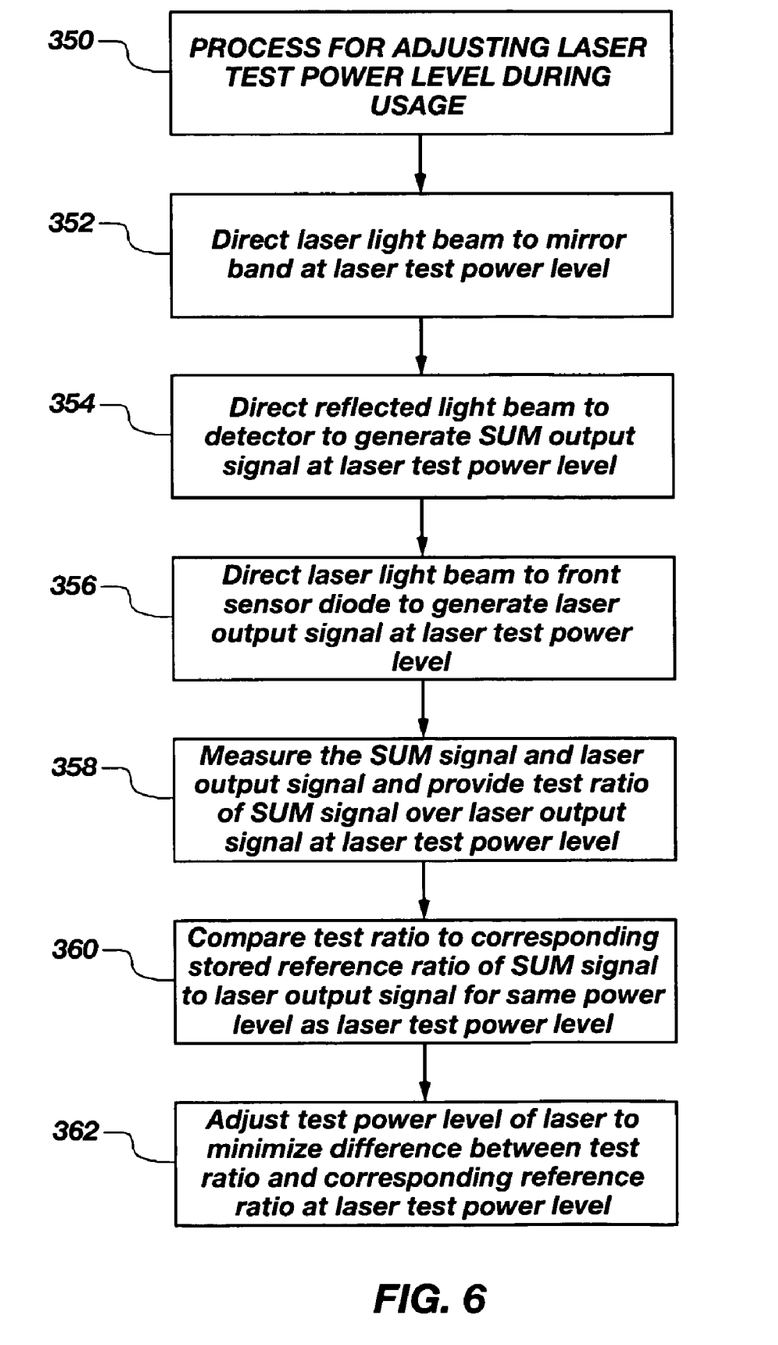
FIG. 6 is a flow diagram of a method of adjusting laser power output in connection with an embodiment of the present invention.

FIG. 6 shows a process 350, referring to the elements in FIG. 2, according to an embodiment of the present invention for adjusting the power level of laser 130 during usage in the field, that is, in normal usage. At step 352, test light beam 132 from laser 130 is directed through the optics to the mirror band 206 at a field power level. At step 354, the reflected light beam 153 is directed to the photo-detector 156 to generate a SUM signal 158. Next, at step 356, the test light beam 132 from the output of the laser 130 may also be detected by the front sense diode 138 before the light passes through the optics. Front sense diode 138 generates a laser test output signal 148 indicative of the level of power being emitted from laser 130 before the light passes through the optics.

Next, at step 358, the amplitudes of the SUM signal 158 and the laser output signal 148 are measured. Since the light beam 132 passes through the optics elements twice before reaching the photo-detector 156, the SUM signal 158 may need to be adjusted to compensate for attrition of the light passing twice through dirty optic elements. Then, a test ratio of SUM signal 158 over laser output signal 148 is determined, relative to the field power level of laser 130. This test ratio may need to be further adjusted for the reflectivity differences between the reference medium and the present field medium. At step 360, the field ratio is compared to the corresponding stored reference ratio of SUM signal to laser output signal for the same power level as the field power level. At step 362, the field power level of laser 130 is then adjusted to minimize the difference between the field ratio and the corresponding reference ratio.

It should be understood that various other methods may be used within the scope of the present invention to compare light beam outputs in the field to known light beam values stored in the processor and to adjust the power of the laser to compensate for a partial loss in light as the laser beam passes through the optics elements.

High Contrast Coating

As an alternative to the mirror band or ring 206, shown in FIG. 3, a high-contrast coating may be added as a ring or other test area on the optical disc. This coating adds to the contrast between written and unwritten areas, so that marks may be more easily detected. Thus, the coating might take the place of the mirror in providing a band of known reflectivity that is useful in calibrating the laser.

By way of review, the imaging materials on the disc react to the write laser operating at an infrared frequency having a wavelength of about 780 nanometers. The imaging coating on the label surface is a mixture of color-forming dye, activator and infrared antenna contained in a polymer matrix. The antenna absorbs the laser energy and converts it to heat. The heat causes the activator, dye and matrix to melt, allowing the activator to interact with the dye. The interaction results in a chemical change to the dye, resulting in an opacity change in the visible light spectra. But in the infrared frequencies, the opacity change is small and there is very little contrast between the written and unwritten materials.

In this embodiment, a thin coating of material may be provided in a narrow ring on the inner diameter of the disc or at another area on the disc. The coating material may be very similar to or the same as the medium material, except that the dye released may be opaque at 780 nm and transparent at visible frequencies. The activator and polymer matrix might remain the same as the medium material. The new material would provide a higher contrast between the written and unwritten media that would improve the accuracy and repeatability of power calibration.

As another alternative, the coating material may be compact disc read (CDR) or compact disc read/write (CDR/W) material. Alternately, the coating material may be DVD or DVD read/write (DVD/W) material. The disadvantages with these alternatives are that a correlation may need to be performed between the results obtained with the CDR/W or DVD/W material and the medium material, and the calibration may leave visible marks on the disc.

Thermal Compensation for Temperature Variations

In another embodiment of the present invention, an rf write laser having a beam with a wavelength of 780 nm is used to deliver energy and make marks on an optical disc. It was determined that, using only front-end calibration in the field using a monitor of the light beam emitted from a laser, there was a loss of power of as much as 30% over the life of the laser system.

To reduce this loss of power, methods of direct and indirect optimal power calibration (OPC) were tested. Direct OPC refers to a process of marking a disc and then observing the reflectivity of the marks. Indirect OPC refers to the process wherein a mirror band is used with high reflectivity to provide a test area to test laser light beam power without directly sensing a mark. Field power ratios are compared to reference power ratios of the SUM signal and the laser output signal at different power levels.

In addition, thermal effects account for an additional plus or minus 6% in variations of the resulting data. Accordingly, thermal compensation methods were used to adjust for power loss caused by temperature changes. Typically, a photo-detector is used for sensing a reflection of light from an image. The photo-detector output is likely to be temperature sensitive and may vary substantially with thermal changes. In accordance with an embodiment of the invention, adjustments may be made to the SUM signal to compensate for temperature changes due to thermal effects.

If there is appropriate compensation for thermal effects, using indirect OPC, a repeatability level of plus or minus 1% was achieved. It is understood that factory calibration accuracy is about plus or minus 5%. Front monitor accuracy is about plus or minus 1%. Adding these last three numbers, the range of error is about plus or minus 8%, which is well below a specification criteria of 10%. Accordingly, the use of indirect OPC according to the present invention, provides reliable results if thermal compensation is used.

Adjusting Laser Power Output to Calibrated Front Sense Diode.

Referring back to FIG. 2, the light beam 132 is directed through lens 134 to a dichroic mirror 136 that causes a portion of the beam to be reflected and pass through a polarizing beam splitter 140 to eventually reach the surface 106 of the optical disc. The remainder of light beam 132 passes through dichroic mirror 136 to a front sense diode 138 that senses the strength of light beam 132.

There are a number of factors that cause variation in the measurement of a laser power output level that will produce a good mark on the disc surface. The front sense diode 138 has been determined to have a relatively stable current over time, making it a good candidate for establishing a bench mark for maintaining the quality of marks on the disc. By tying the power measured by the front sense diode directly to a desired or target mark quality, much of the measurement variation can be removed.

Figure 7:
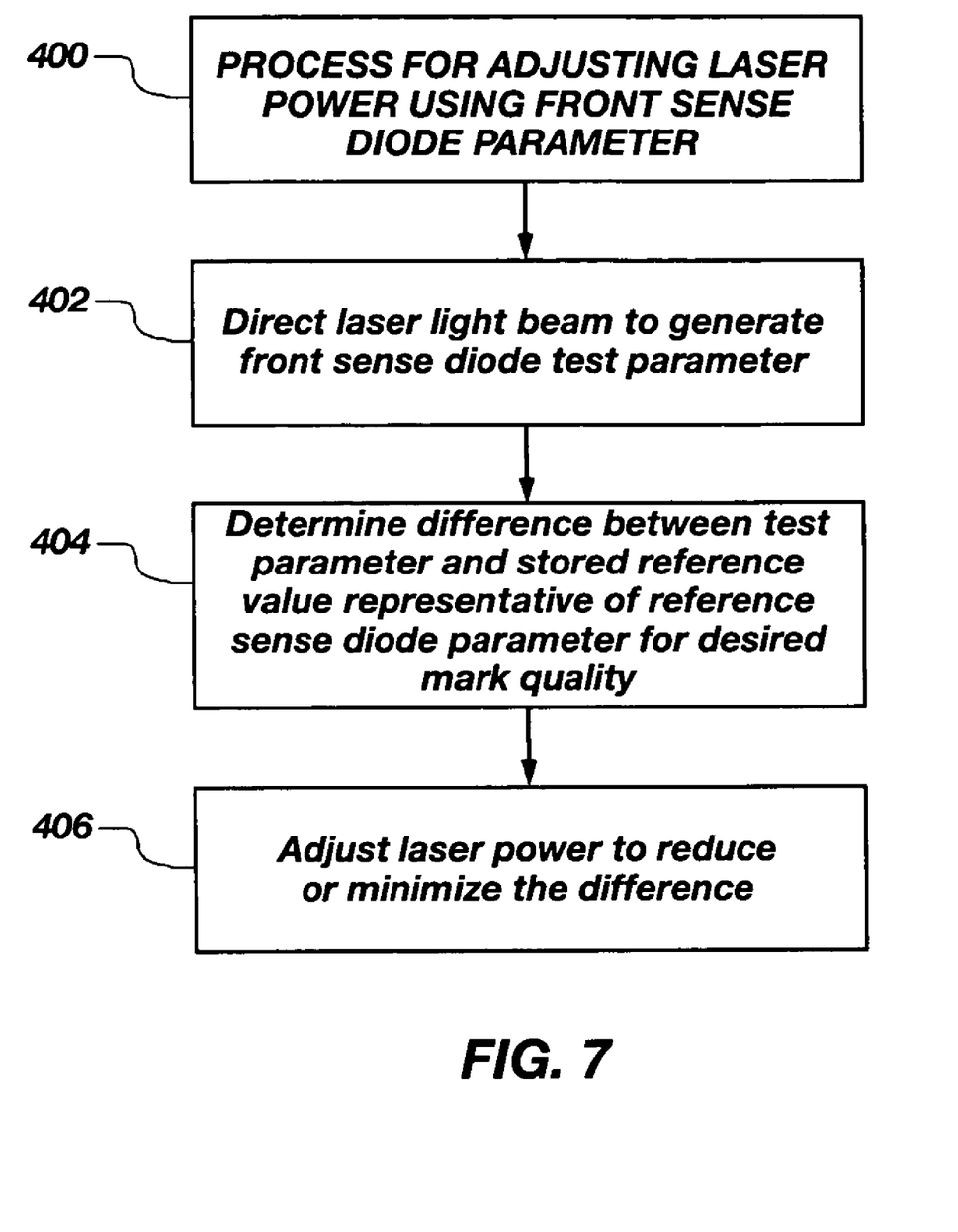
FIG. 7 is a flow diagram of a method of adjusting laser power output using a front end diode parameter.

Referring now to FIG. 7, a flow diagram is shown for a process 400 of adjusting laser power output using a reference parameter for the front sense diode. In the factory, or in the field, the front sense diode 138 output voltage or current may be set to correspond to a laser power output that yields a desired mark quality. This desired mark quality may correspond to a desired operating point that is well centered between ablation and fade limits. At that operating point, a reference value for the front sense diode 138, such as current, is determined and stored in memory for further use. Then, as the system drives are writing on an optical disc, the current of the front sense diode 138 is maintained at the stored reference value.

Using the above approach, at step 402, the writing laser beam is directed to the front sense diode 138 to generate a test current in the diode. At step 404, this test current is compared to the reference value for diode current stored in memory, and the difference between the test current and the reference value is determined. At step 406, the laser power output is adjusted, usually by increasing the power as the laser ages, to minimize the difference. Thus, any variations in the power of laser 130 over time will cause a difference in the current of the front sense diode. Thus differences in laser power output over time will be measured against the reference standard of the front sense diode current. When the front sense diode 138 is operating at the required reference level, the laser write power should be at a level to produce a mark of desired quality.

Adjusting Front Sense Diode with Correction Factor.

A further adjustment, involving changes to the output of the front sense diode may further improve marking quality over time. In label writing over the life of a laser and laser drive, the power calibration may drift for a number of reasons, including contamination buildup on the optics. This drift may continue to degrade the power margin of a laser drive, which may eventually cause a laser drive to go out of media specification.

During data side operation, the laser drive executes optimal power calibration (OPC) routines that adjust the write power for minimal jitter and maximum waveform symmetry. Although this power optimization is specific to the media being written, the overall trend of required write power across several discs may be determined, so as to assess how much the laser power output has drifted compared to a front sense diode parameter, such as current. This determination may be carried out by maintaining a running average of the front sense diode parameter compared to the actual optimal power determined using OPC. A correction factor may be determined from this relationship and then applied to the laser system during a process of writing to a label side or area. For label side printing, the front sense diode parameter would be adjusted by the correction factor to set the labeling laser power output.

Figure 8:
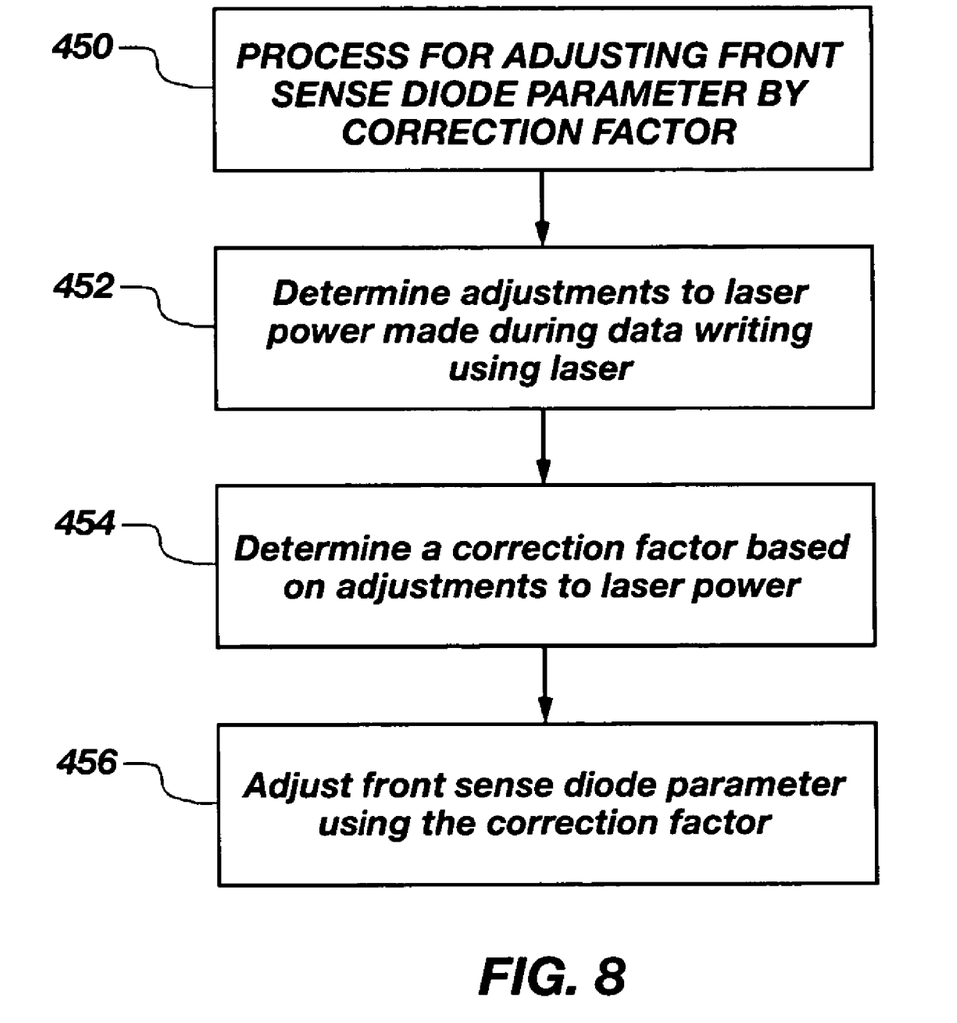
FIG. 8 is a flow diagram of a method of adjusting a front sense diode parameter using a correction factor.

Referring to FIG. 8, a flow diagram is shown for a process 450 of adjusting the output of the front sense diode by a correction factor determined from writing data. At step 452, a determination is made of changes in laser power output during writing data on an optical disc. At step 454, a correction factor is derived from these changes. The correction factor may be determined by comparing a running average of front sense diode current versus actual optimal power determined via direct or indirect OPC, as mentioned above, or in some other manner. At step 456, the current output or other output parameter of the front sense diode is adjusted by the correction factor to compensate for the laser power output drift previously determined during data writing.

It should be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A method of compensating for variations in laser power output over time in a system using a laser to record visible marks on an optical disc, the method comprising:
   (a) applying a test light beam from the laser to the optical disc to determine a test value of an optical parameter;
   (b) determining a difference between the test value and a predetermined reference value for the optical parameter; and
   (c) adjusting the laser power output to compensate for the difference;
   wherein the step of applying a test light beam comprises applying the light beam to a reflective surface on the optical disc to generate a test SUM signal and wherein the reflective surface is more reflective at a visible light wavelength than at a non-visible wavelength of the test light beam.

2. The method of claim 1, wherein the step of determining a difference comprises comparing the test SUM signal to a reference SUM signal.

3. The method of claim 2, wherein the step of adjusting comprises adjusting the laser power output to reduce the difference between the test SUM signal and the reference SUM signal.

4. The method of claim 1, wherein the reflective surface is a coating that forms a thin ring on the optical disc.

5. The method of claim 1, wherein the step of adjusting the laser power output comprises adjusting the laser power output to increase or decrease optical density of the visible marks.

6. The method of claim 1, wherein the reflective surface is a CDR or CDRW material.

7. The method of claim 1, wherein the test SUM signal varies according to temperature changes in the system, and further comprising adjusting the test SUM signal to compensate for the temperature changes.

8. The method of claim 7, wherein the test SUM signal is produced by a photo-detector and the step of adjusting the test SUM signal comprises changing an output signal of the photo-detector to compensate for the temperature changes.

9. The method of claim 1, wherein the step of determining a difference comprises determining a test parameter of a front sense diode that senses the test light beam, and comparing the test parameter to a reference parameter for the front sense diode.

10. The method of claim 9, wherein the test parameter is a test current of the front sense diode responsive to the test light beam, and the reference parameter is a reference current of the front sense diode responsive to a reference light beam.

11. The method of claim 10, wherein the reference light beam is a light beam that generates a visible mark having a reference degree of darkness.

12. The method of claim 1, wherein the step of adjusting the laser power output comprises adjusting the laser power output by a correction factor corresponding to a change in the laser power output determined during writing of data by the laser on an optical disc.

13. The method of claim 12, wherein the test value of an optical parameter is the output of a component in the system that senses the test light beam.

14. The method of claim 13, wherein the component comprises a front sense diode that senses the test light beam.

15. The method of claim 1, wherein the visible marks are label images recorded in a label area of the optical disc.

16. An apparatus for compensating for variations in laser power output over time in a system using a laser to record visible marks on an optical disc, the apparatus comprising:
(a) light directing means coupled with the laser for applying a test light beam from the laser to the optical disc to determine a test value of an optical parameter;
(b) processor means for determining a difference between the test value and a predetermined reference value for the optical parameter; and
(c) adjusting means for adjusting the laser power output to compensate for the difference;
wherein the light directing means comprises means for applying the test light beam to a reflective surface on the optical disc to generate a test SUM signal and wherein the reflective surface is more reflective at a visible light wavelength than at a non-visible wavelength of the test light beam.

17. The apparatus of claim 16, wherein the processor means comprises means for comparing the test SUM signal to a reference SUM signal.

18. The apparatus of claim 17, wherein the adjusting means comprises control means for adjusting the laser power output to reduce the difference between the test SUM signal and the reference SUM signal.

19. The apparatus of claim 16, wherein the reflective surface is substantially opaque at the non-visible wavelength of the test light beam, and is substantially transparent at a wavelength of visible light.

20. The apparatus of claim 16, wherein the reflective surface is a coating forming a ring on the optical disc.

21. The apparatus of claim 16, wherein the adjusting means comprises means for adjusting the laser power output to increase or decrease optical density of the visible marks.

22. The apparatus of claim 16, wherein the reflective surface is a CDR or CDRW material.

23. The apparatus of claim 16, wherein the test SUM signal varies according to temperature changes in the system, and further comprising means for adjusting the test SUM signal to compensate for the temperature changes.

24. The apparatus of claim 23, wherein the means for sensing the test SUM signal is a photo-detector and the means for adjusting the test SUM signal comprises means for changing the output signal of the photo-detector to compensate for the temperature changes.

25. The apparatus of claim 16, wherein the processor means for determining a difference comprises means for determining a test parameter of a front sense diode that senses the test light beam, and means for comparing the test parameter to a reference parameter for the front sense diode.

26. The apparatus of claim 25, wherein the test parameter is a test current produced by the front sense diode responsive to the test light beam, and the reference parameter is a reference current of the front sense diode responsive to a reference light beam.

27. The apparatus of claim 26, wherein the reference light beam is a light beam that generates a visible mark having a reference degree of darkness.

28. An apparatus for compensating for variations in laser power output over time in a system using a laser to record visible marks on an optical disc, the apparatus comprising:
(a) a laser for applying a test light beam to the optical disc to determine a test value of an optical parameter;
(b) a detector associated with the laser power output for sensing the test value of the optical parameter;
(c) a processor coupled to the detector for determining a difference between the test value and a predetermined reference value for the optical parameter; and
(d) a controller coupled to the processor for adjusting the laser power output to compensate for the difference;
wherein the detector is configured to determine a test parameter of a front sense diode that senses the test light beam, and the processor is configured to compare the test parameter to a reference parameter for the front sense diode.

29. The apparatus of claim 28, further comprising a reflective surface on the optical disc, the test light beam being applied to the reflective surface to generate a test SUM signal, wherein the detector senses the test SUM signal.

30. The apparatus of claim 29, wherein the processor includes comparison means for comparing the test SUM signal to a reference SUM signal.

31. The apparatus of claim 30, wherein the controller comprises a control unit for adjusting the laser power output to reduce the difference between the test SUM signal and the reference SUM signal.

32. The apparatus of claim 28, wherein the test parameter is a test current of the front sense diode responsive to the test light beam, and the reference parameter is a reference current of the front sense diode responsive to a reference light beam.

33. The apparatus of claim 32, wherein the reference light beam is a light beam that generates a visible mark having a reference degree of darkness.

34. A program storage system readable by a computer, tangibly embodying a program, applet or instructions executable by the computer to cause a laser marking system to perform a method of compensating for variations in laser power output over time in a system using a laser to record visible marks on an optical disc, the method comprising:
(a) applying a test light beam from the laser to the optical disc to determine a test value of an optical parameter;
(b) determining a difference between the test value and a predetermined reference value for the optical parameter; and
(c) adjusting the laser power output to compensate for the difference;
wherein the step of determining a difference comprises determining a test parameter of a front sense diode that senses the test light beam, and comparing the test parameter to a reference parameter for the front sense diode.

35. The program storage system of claim 34 wherein the step of applying a light beam comprises applying the light beam to a reflective surface on the optical disc to generate a test SUM signal.

36. The program storage system of claim 35 wherein the step of determining a difference comprises comparing the test SUM signal to a reference SUM signal.

37. The program storage system of claim 36, wherein the step of adjusting comprises adjusting the laser power output to reduce the difference between the test SUM signal and the reference SUM signal.

38. The program storage system of claim 35, wherein the test SUM signal varies according to temperature changes in the system, and the method further comprising adjusting the test SUM signal to compensate for the temperature changes.

39. The program storage system of claim 38, wherein the test SUM signal is produced by a photo-detector and the step of adjusting the test SUM signal comprises changing the output signal of the photo-detector to compensate for the temperature changes.

40. The program storage system of claim 34, wherein the test parameter is a test current of the front sense diode responsive to the test light beam, and the reference parameter is a reference current of the front sense diode responsive to a reference light beam.

41. An optical disc having a recording area for recording visible marks on a label side of the disc, comprising a reflective area that is substantially reflective of visible light on the label side of the disc, wherein the reflective area is a mirror area adjacent to the recording area.

42. The optical disc of claim 41, wherein the reflective area is a mirror band on the label side.

43. An optical disc having a recording area for recording visible marks on a label side of the disc, comprising a reflective area that is substantially reflective of visible light on the label side of the disc, wherein the reflective area is a coating over the recording area.

44. The optical disc of claim 43, wherein the coating forms a thin ring on the optical disc.

45. A method of compensating for variations in laser power output over time in a system using a laser to record visible marks on an optical disc, the method comprising:
(a) applying a test light beam from the laser to the optical disc to determine a test value of an optical parameter;
(b) determining a difference between the test value and a predetermined reference value for the optical parameter; and
(c) adjusting the laser power output to compensate for the difference;
wherein the step of applying a test light beam comprises applying the light beam to a reflective surface on the optical disc to generate a test SUM signal and wherein the reflective surface is substantially opaque at the non-visible wavelength of the test light beam, and is substantially transparent at a wavelength of visible light.

46. A method of compensating for variations in laser power output over time in a system using a laser to record visible marks on an optical disc, the method comprising:
(a) applying a test light beam from the laser to the optical disc to determine a test value of an optical parameter;
(b) determining a difference between the test value and a predetermined reference value for the optical parameter; and
(c) adjusting the laser power output to compensate for the difference;
wherein the step of applying a test light beam comprises applying the light beam to a reflective surface on the optical disc to generate a test SUM signal and wherein the step of adjusting the laser power output comprises adjusting the laser power output to increase or decrease optical density of the visible marks.

47. A method of compensating for variations in laser power output over time in a system using a laser to record visible marks on an optical disc, the method comprising:
(a) applying a test light beam from the laser to the optical disc to determine a test value of an optical parameter;
(b) determining a difference between the test value and a predetermined reference value for the optical parameter; and
(c) adjusting the laser power output to compensate for the difference;
wherein the step of determining a difference comprises determining a test parameter of a front sense diode that senses the test light beam, and comparing the test parameter to a reference parameter for the front sense diode.

48. A method of compensating for variations in laser power output over time in a system using a laser to record visible marks on an optical disc, the method comprising:
(a) applying a test light beam from the laser to the optical disc to determine a test value of an optical parameter;
(b) determining a difference between the test value and a predetermined reference value for the optical parameter; and
(c) adjusting the laser power output to compensate for the difference;
wherein the visible marks are label images recorded in a label area of the optical disc.

49. An apparatus for compensating for variations in laser power output over time in a system using a laser to record visible marks on an optical disc, the apparatus comprising:
(a) light directing means coupled with the laser for applying a test light beam from the laser to the optical disc to determine a test value of an optical parameter;
(b) processor means for determining a difference between the test value and a predetermined reference value for the optical parameter; and
(c) adjusting means for adjusting the laser power output to compensate for the difference;
wherein the light directing means comprises means for applying the test light beam to a reflective surface on the optical disc to generate a test SUM and wherein the adjusting means comprises means for adjusting the laser power output to increase or decrease optical density of the visible marks.

50. An apparatus for compensating for variations in laser power output over time in a system using a laser to record visible marks on an optical disc, the apparatus comprising:
   (a) light directing means coupled with the laser for applying a test light beam from the laser to the optical disc to determine a test value of an optical parameter;
   (b) processor means for determining a difference between the test value and a predetermined reference value for the optical parameter; and
   (c) adjusting means for adjusting the laser power output to compensate for the difference;
   wherein the light directing means comprises means for applying the test light beam to a reflective surface on the optical disc to generate a test SUM and wherein the test SUM signal varies according to temperature changes in the system, and further comprising means for adjusting the test SUM signal to compensate for the temperature changes.

51. The apparatus of claim 50, wherein the means for sensing the test SUM signal is a photo-detector and the means for adjusting the test SUM signal comprises means for changing the output signal of the photo-detector to compensate for the temperature changes.

52. An apparatus for compensating for variations in laser power output over time in a system using a laser to record visible marks on an optical disc, the apparatus comprising:
   (a) light directing means coupled with the laser for applying a test light beam from the laser to the optical disc to determine a test value of an optical parameter;
   (b) processor means for determining a difference between the test value and a predetermined reference value for the optical parameter; and
   (c) adjusting means for adjusting the laser power output to compensate for the difference;
   wherein the processor means for determining a difference comprises means for determining a test parameter of a front sense diode that senses the test light beam, and means for comparing the test parameter to a reference parameter for the front sense diode.

53. The apparatus of claim 52, wherein the test parameter is a test current produced by the front sense diode responsive to the test light beam, and the reference parameter is a reference current of the front sense diode responsive to a reference light beam.

54. The apparatus of claim 53, wherein the reference light beam is a light beam that generates a visible mark having a reference degree of darkness.

55. A program storage system readable by a computer, tangibly embodying a program, applet or instructions executable by the computer to cause a laser marking system to perform a method of compensating for variations in laser power output over time in a system using a laser to record visible marks on an optical disc, the method comprising:
   (a) applying a test light beam from the laser to the optical disc to determine a test value of an optical parameter;
   (b) determining a difference between the test value and a predetermined reference value for the optical parameter; and
   (c) adjusting the laser power output to compensate for the difference;
   wherein the test SUM signal varies according to temperature changes in the system, and the method further comprising adjusting the test SUM signal to compensate for the temperature changes and wherein the test SUM signal is produced by a photo-detector and the step of adjusting the test SUM signal comprises changing the output signal of the photo-detector to compensate for the temperature changes.

* * * * *